(12) United States Patent
Takuma et al.

(10) Patent No.: US 9,471,548 B2
(45) Date of Patent: *Oct. 18, 2016

(54) TEXT PROCESSING METHOD, SYSTEM AND COMPUTER PROGRAM

(71) Applicant: INTERNATIONAL BUSINESS MACHINES CORPORATION, Armonk, NY (US)

(72) Inventors: Daisuke Takuma, Tokyo (JP); Hiroki Yanagisawa, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 231 days.

This patent is subject to a terminal disclaimer.

(21) Appl. No.: 13/962,402

(22) Filed: Aug. 8, 2013

(65) Prior Publication Data

US 2014/0046953 A1   Feb. 13, 2014

(30) Foreign Application Priority Data

Aug. 10, 2012  (JP) .................................. 2012-178600

(51) Int. Cl.
*G06F 7/00* (2006.01)
*G06F 17/30* (2006.01)
*G06F 17/21* (2006.01)

(52) U.S. Cl.
CPC ......... *G06F 17/21* (2013.01); *G06F 17/30616* (2013.01)

(58) Field of Classification Search
CPC .... G06F 17/28; G06F 17/27; G06F 17/3061; G06F 17/30625; G06F 17/30684; G06K 9/6276

See application file for complete search history.

(56) References Cited

U.S. PATENT DOCUMENTS 5,940,836 A * 8/1999 Fukushima ....... G06F 17/30622
6,169,999 B1 * 1/2001 Kanno ................ G06F 17/2735
                                                                      704/10

(Continued)

FOREIGN PATENT DOCUMENTS

JP   06-075999    3/1994
JP   06-348757   12/1994

(Continued)

OTHER PUBLICATIONS

Office Action dated Dec. 29, 2015 for U.S. Appl. No. 14/021,458.

(Continued)

*Primary Examiner* — Sherief Badawi
*Assistant Examiner* — Berhanu Mitiku
(74) *Attorney, Agent, or Firm* — Tutunjian & Bitetto, P.C.; Keivan Razavi

(57) ABSTRACT

A method includes hierarchically identifying occurrences of some of the words in the set of sentences; creating a first index for each of some of the words based on the upper hierarchy of occurrences identified for each word; receiving input of a queried word; hierarchically identifying occurrences of the queried word in the set of sentences; creating a second index based on the upper hierarchy of occurrences identified for the queried word; comparing the first index and the second index to calculate an estimated value for the number of occurrences of a word in the neighborhood of the queried word; and calculating the actual value of the number of occurrences of a word in the neighborhood of the queried word based on an upper hierarchy and lower hierarchy of the occurrences on condition that the estimated value is equal to or greater than a predetermined number.

16 Claims, 8 Drawing Sheets

(56) References Cited

U.S. PATENT DOCUMENTS

| | | | |
|---|---|---|---|
| 2009/0222407 A1* | 9/2009 | Takuma | G06F 17/30684 |
| 2009/0265342 A1 | 10/2009 | Shuster | |
| 2011/0282880 A1 | 11/2011 | Krichman et al. | |
| 2012/0143683 A1 | 6/2012 | Hertz et al. | |

FOREIGN PATENT DOCUMENTS

| | | |
|---|---|---|
| JP | 07-182354 | 7/1995 |
| JP | 08-287105 | 11/1996 |
| JP | H08329112 A | 12/1996 |
| JP | 10-334114 | 12/1998 |
| JP | 11-154164 | 6/1999 |
| JP | 2001-075981 | 3/2001 |
| JP | 2001-101194 | 4/2001 |
| JP | 2001-14575 | 5/2001 |
| JP | 2007-034827 | 2/2007 |
| JP | 2007-156739 | 6/2007 |
| JP | 2008-243074 | 10/2008 |
| JP | 2009043125 A | 2/2009 |
| JP | 2009193219 A | 8/2009 |
| JP | 2009-199151 | 9/2009 |
| JP | 2009-211263 | 9/2009 |
| JP | 2009271819 A | 11/2009 |
| JP | 2010-198425 | 9/2010 |
| JP | 2010198425 A | 9/2010 |
| JP | 2011-253572 | 12/2011 |

OTHER PUBLICATIONS

Non-Final Office action for U.S. Appl. No. 14/021,458 mailed on Jul. 1, 2015.

Tsuneji Futagami et al., "Compression and decoding of an inverted file by using syndrome" Technical Report of IEICE, The Institute of Electronics information and Communication Engineers, vol. 99, No. 235, Jul. 1999. (pp. 1-9).

Masao Fuketa et al, "An Efficient Algorithm of Retrieving Example Sentences from Huge Text Data Bases" Transaction of Information Processing Society of Japan, Information Processing Society of Japan, vol. 38, No. 10 Oct. 1997. (pp. 1-13).

\* cited by examiner

FIG. 6
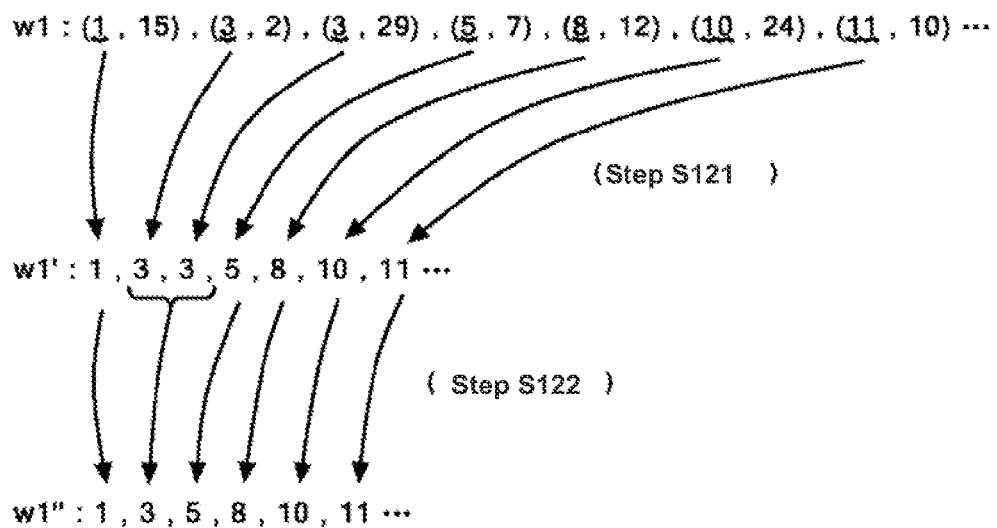
FIG. 7
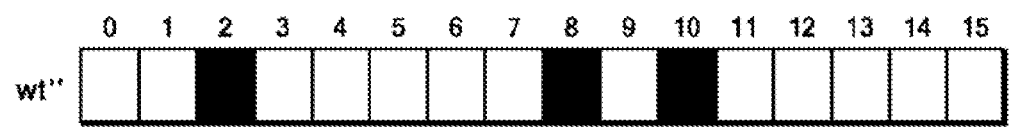
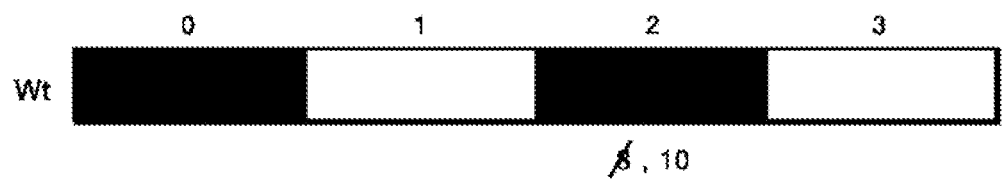
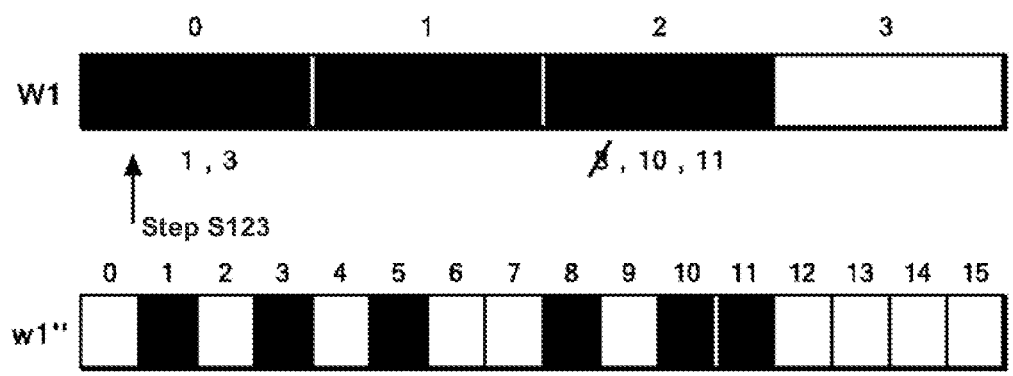

(wtop-1 , #top-1)

(wtop-2 , #top-2)

⋮

(wtop-k , #top-k)

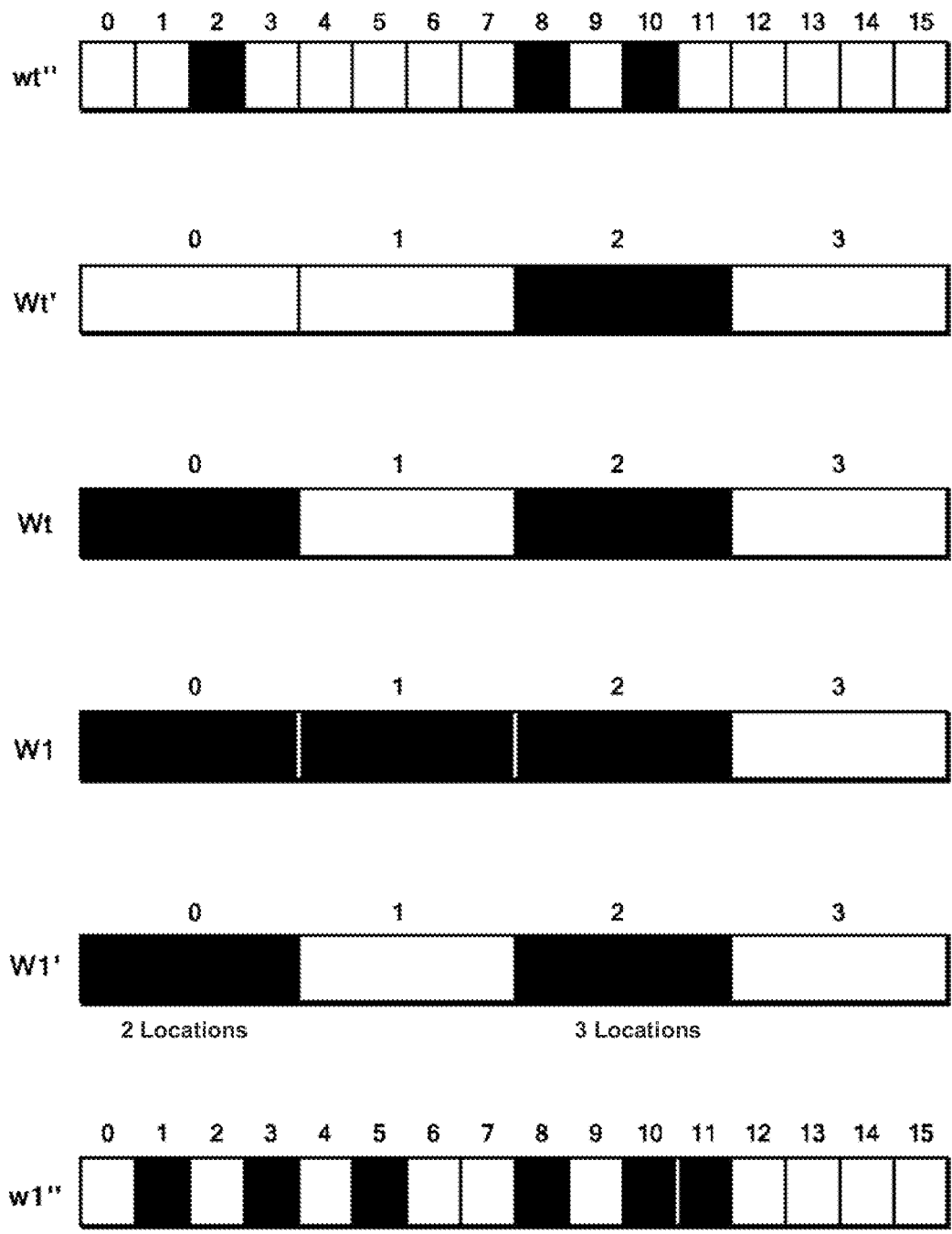

TEXT PROCESSING METHOD, SYSTEM AND COMPUTER PROGRAM

TECHNICAL FIELD

The present invention relates to a text processing technique and, more specifically, to a technique for rapidly determining which words frequently occur in the neighborhood of a certain word.

BACKGROUND ART

With the expansion of information processing technology, large amounts of diverse text data are now analyzed for new findings in a wide variety of fields. Examples include the analysis of microblogging data over networks, product information data at manufacturers, product sales data at sellers, and clinical data at medical institutions. When processing text data, various approaches, including those of the present inventors (Patent Literature 1 and 2) have been proposed for the so-called top-k problem, which is extracting the top k among frequently occurring words. A neighborhood search technique has also been proposed which uses an inverted index to determine which words occur frequently in the neighborhood of a given keyword (Patent Literature 3 through 14).

CITATION LIST

Patent Literature

Patent Literature 1 Laid-open Patent Publication No. 2007-156739
Patent Literature 2 Laid-open Patent Publication No. 2009-211263
Patent Literature 3 Laid-open Patent Publication No. 2010-198425
Patent Literature 4 Laid-open Patent Publication No. 2008-243074
Patent Literature 5 Laid-open Patent Publication No. 06-348757
Patent Literature 6 Laid-open Patent Publication No. 2009-199151
Patent Literature 7 Laid-open Patent Publication No. 08-287105
Patent Literature 8 Laid-open Patent Publication No. 07-182354
Patent Literature 9 Laid-open Patent Publication No. 11-154164
Patent Literature 10 Laid-open Patent Publication No. 2001-75981
Patent Literature 11 Laid-open Patent Publication No. 2011-253572
Patent Literature 12 Laid-open Patent Publication No. 2001-134575
Patent Literature 13 Laid-open Patent Publication No. 2001-101194
Patent Literature 14 Laid-open Patent Publication No. 10-334114

SUMMARY OF INVENTION

However, a faster neighborhood search technique is desired for situations in which there is a large amount of sentences to be searched and in which real-time analysis is to be performed. In particular, faster neighborhood searching by a single computer system is desired because poor search accuracy and operational complexity are common in parallel processing performed by a plurality of computer systems.

In light of these problems, an object of the present invention is to provide a text processing method, computer, and computer program to enable faster top-k neighborhood searches.

The following is an explanation of the present invention embodied as a method. Here, the present invention is a method of processing by computer a set of a plurality of sentences including a plurality of words, in which the method includes the steps of: hierarchically identifying occurrences of at least some of the words in the set of sentences; creating a first index for each of at least some of the words based on the upper hierarchy of occurrences identified for each word; receiving input of a queried word; hierarchically identifying occurrences of the queried word in the set of sentences; creating a second index based on the upper hierarchy of occurrences identified for the queried word; comparing the first index and the second index to calculate an estimated value for the number of occurrences of a word in the neighborhood of the queried word; and calculating the actual value of the number of occurrences of a word in the neighborhood of the queried word based on an upper hierarchy and lower hierarchy of the occurrences on condition that the estimated value is equal to or greater than a predetermined number.

Here, the first index and the second index can have an upper hierarchy bit set compressed by 1/N (N: natural number), and a compressed bit can be true on condition that one or more uncompressed bits is true. Also, the comparison of the first index and the second index can be performed faster by bit calculation.

In one example of an estimated value calculating method, an element of the corresponding upper hierarchy can be stored, and the estimated value of the number of occurrences of a word in the neighborhood of the queried word can be calculated based on the element on condition that two or more uncompressed bits are true. In another example, the number of elements of the corresponding upper hierarchy can be stored, and the estimated value of the number of occurrences of a word in the neighborhood of the queried word can be calculated based on the number of elements on condition that two or more uncompressed bits are true. More specifically, a third index can be created having an upper hierarchy bit set of the identified occurrences corresponding to each word compressed by 1/N (N: natural number), a compressed bit being true on condition that two or more uncompressed bits are true; a fourth index can be created having an upper hierarchy bit set of the identified occurrences corresponding to the queried word by 1/N (N: natural number), a compressed bit being true on condition that two or more uncompressed bits are true; and the step of calculating the estimated value can compare the third index and the fourth index by bit calculation. In this way, the estimated value can be calculated more quickly.

Also, the step of calculating the actual value of the number of occurrences of a word is skipped on condition that the estimated value does not satisfy a predetermined number, and the estimated value of the number of occurrences of the next word is calculated. This can increase the speed of the overall operation.

Also, the method may also include a step of storing K (K: natural number) provisionally top frequently occurring words among the words occurring in the neighborhood of the queried word; and the step of calculating the actual value of the number of occurrences of a word can calculate the actual value of the number of occurrences of the word in the neighborhood of the queried word based on the upper hierarchy and lower hierarchy of the occurrences on condition that the estimated value is equal to or greater than the Kth provisionally top frequently occurring word. Here, the method also includes a step of updating the Kth provisionally top frequently occurring word on condition that the number of occurrences of an estimated word is equal to or greater than the number of occurrences of the K provisionally top frequently occurring words.

The estimated value of the number of occurrences of a word is preferably a value equal to or greater than the actual value of the number of occurrences of the word. In other words, the estimated value of the number of occurrences of the word is preferably the upper bound value of the number of occurrences of the word. Also, an estimated value of the number of occurrences of a word can be calculated in order of frequency of occurrence for at least some of the words in a set of a plurality of sentences. Also, the method may also include a step of outputting K (K: natural number) provisionally top frequently occurring words as the final K top frequently occurring words on condition that all of at least some of the words have been completely examined.

Here, at least some of the words preferably include the L (L: natural number) top frequently occurring words in the set of a plurality of sentences. Also, at least some of the words can include words of a particular part of speech in the set of a plurality of sentences. In addition, the neighborhood of a queried word can be established in advance as a range X words (X: integer) before and Y (Y: integer) words after an occurrence of the queried word. Note that the upper hierarchy of occurrences can be a sentence ID specifying one sentence among the plurality of sentences, and the lower hierarchy of occurrences can be a position ID specifying the position of the one sentence.

When the present invention is embodied as a computer program or computer system, it has essentially the same technical characteristics as the present invention embodied as a method.

The present invention enables faster top-k neighborhood searches.

BRIEF DESCRIPTION OF DRAWINGS

FIG. 6 is a diagram used to explain Step S121 and Step S122 schematically.

FIG. 7 is a schematic diagram used to explain 1/N compression and the estimated value calculation.

FIG. 11 is a schematic diagram used to explain 1/N compression and the estimated value calculation in a modification of the embodiment.

DESCRIPTION OF EMBODIMENTS

Embodiment

Figure 1:
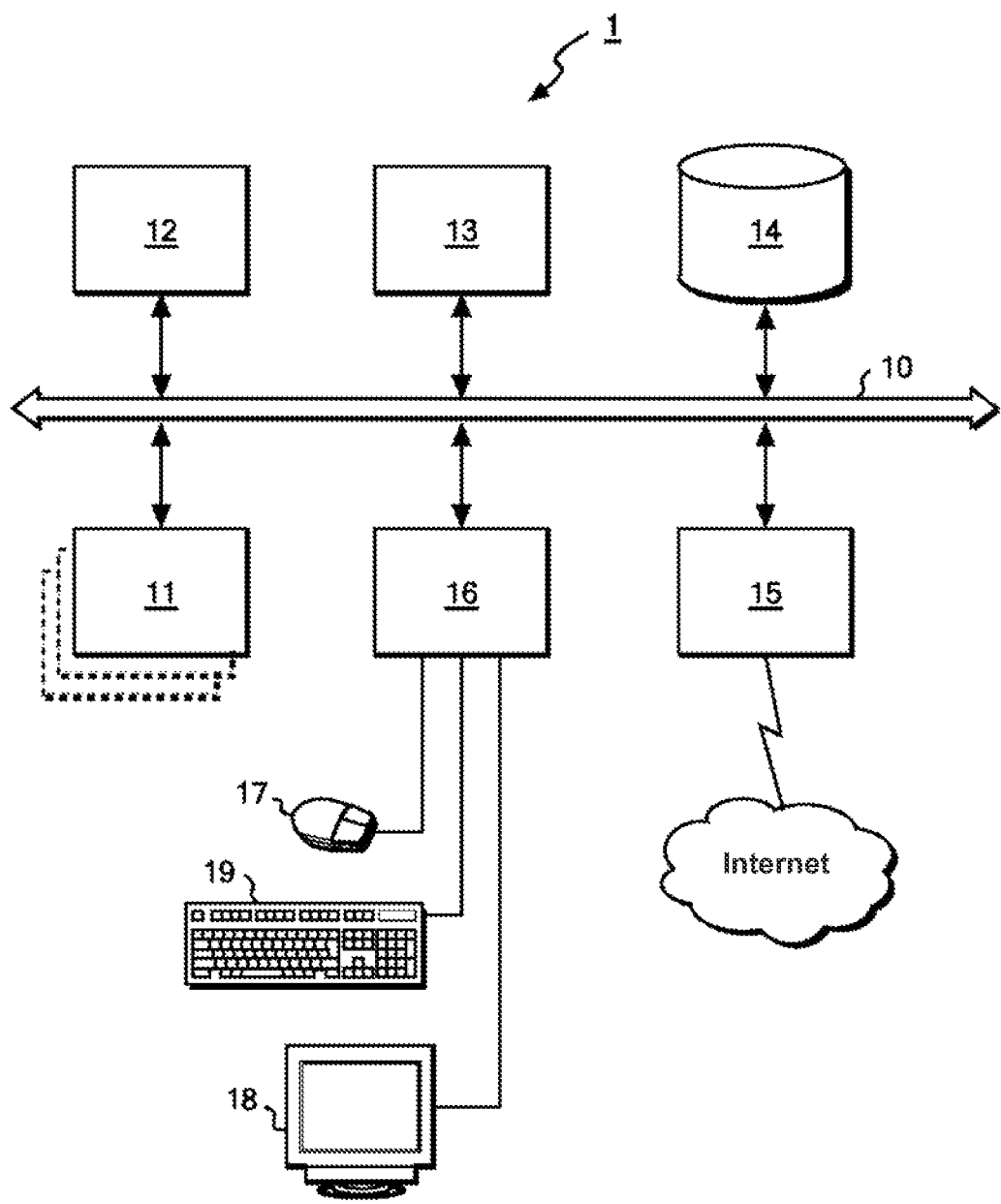
FIG. 1 is a block diagram showing the hardware configuration of a computer 1 according to an embodiment of the present invention.

FIG. 1 is a block diagram showing the hardware configuration of a computer 1 according to an embodiment of the present invention. The hardware configuration of the computer 1 includes a (low-speed and high-speed) bus 10, and a central processing unit (CPU) 11, random-access memory (RAM: storage device) 12, read-only memory (ROM: storage device) 13, hard disk drive (HDD: storage device) 14, communication interface 15, and input/output interface 16 connected to the bus 10. A mouse (pointing device) 17, flat panel display (display device) 18, and keyboard 19 are connected to the input/output interface 16. In this explanation, the computer 1 has a typical personal computer architecture. However, the CPU 11, HDD 14 and other components can be multiplexed to achieve higher data throughput and availability. Instead a desktop, the computer system can be any other type of personal computer, such as a laptop or tablet.

The software configuration of the computer 1 includes an operating system (OS) for providing basic functions, application software using OS functions, and driver software for the input/output devices. Each type of software is loaded with various types of data into the RAM 12, and executed by the CPU 11. As a whole, the computer 1 comprises the function modules shown in FIG. 2, and executes the processing shown in FIG. 3.

Figure 2:
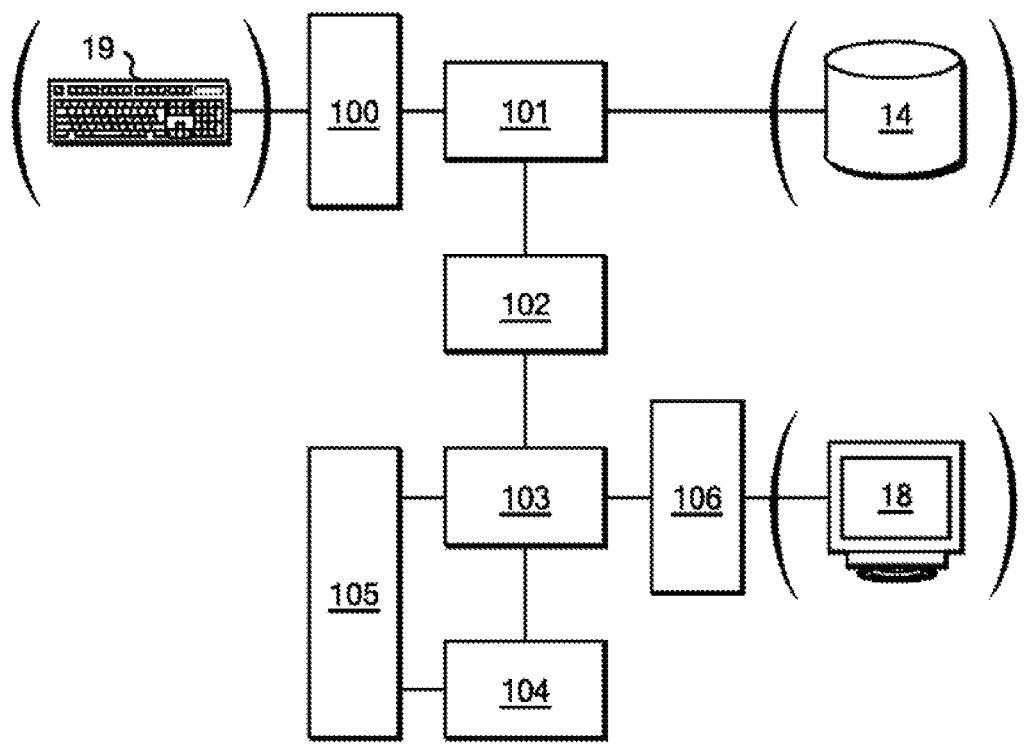
FIG. 2 is a block diagram used to explain the function modules of the computer 1.

FIG. 2 is a block diagram used to explain the function modules of the computer 1. The computer 1 includes a specifying module (specifying means) 101, an index creating module (creating means) 102, an input module (input means) 100, a storing module (storing means) 103, a computing module (computing means) 104, an updating module (updating means) 105, and an output module (output means) 106. These functions will be explained in greater detail below when the processing is explained with reference to FIG. 3.

Figure 3:
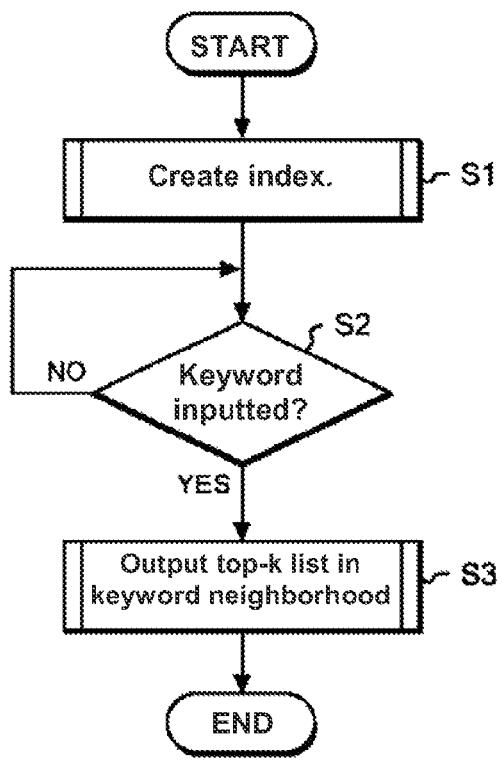
FIG. 3 is a flowchart used to explain the processing executed by the computer 1.

FIG. 3 is a flowchart used to explain the processing performed by the computer 1. First, a word compression file (first index) is created (Step S1). The processing in Step S1 can be performed as batch processing. Next, the user inputs a keyword wt to be searched via the keyboard 19 and the input module 100 (Step S2). When the keyword wt has been inputted, the top-k words frequently occurring in the neighborhood of the keyword are outputted (displayed) along with the number of occurrences for each to the user via the output module 106 and the display 18. The processing in Step S3 should be especially fast in order to perform real time processing. The following is a more detailed explanation of the processing performed by the computer 1 in Steps S1 and S3 with reference to FIG. 4 through FIG. 11.

Figure 4:
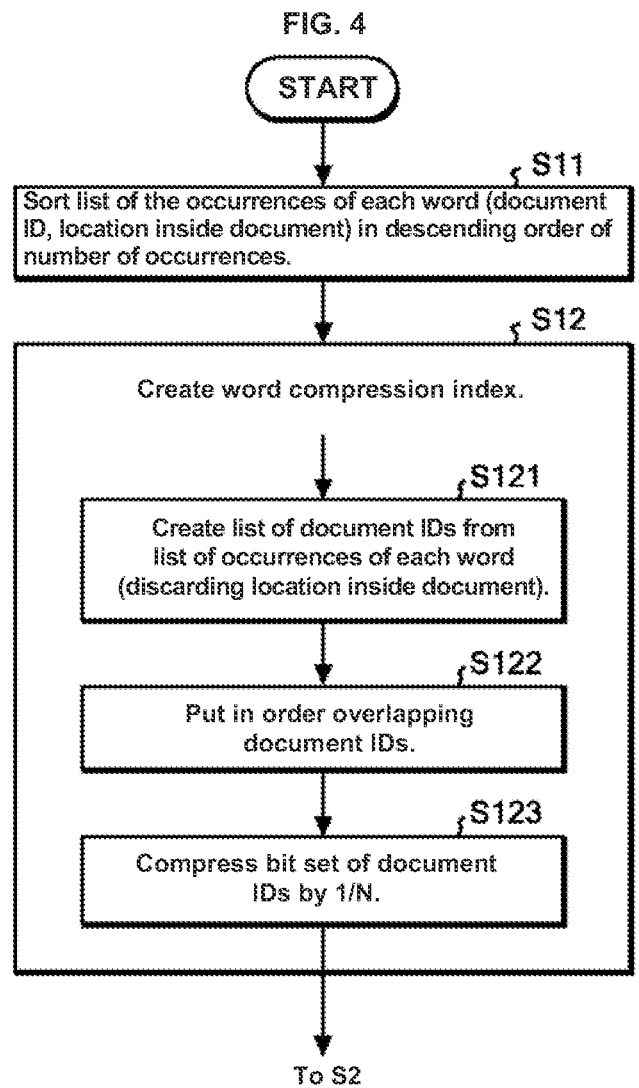
FIG. 4 is a flowchart used to explain in greater detail the processing in Step S1 of FIG. 3.
Figure 5:
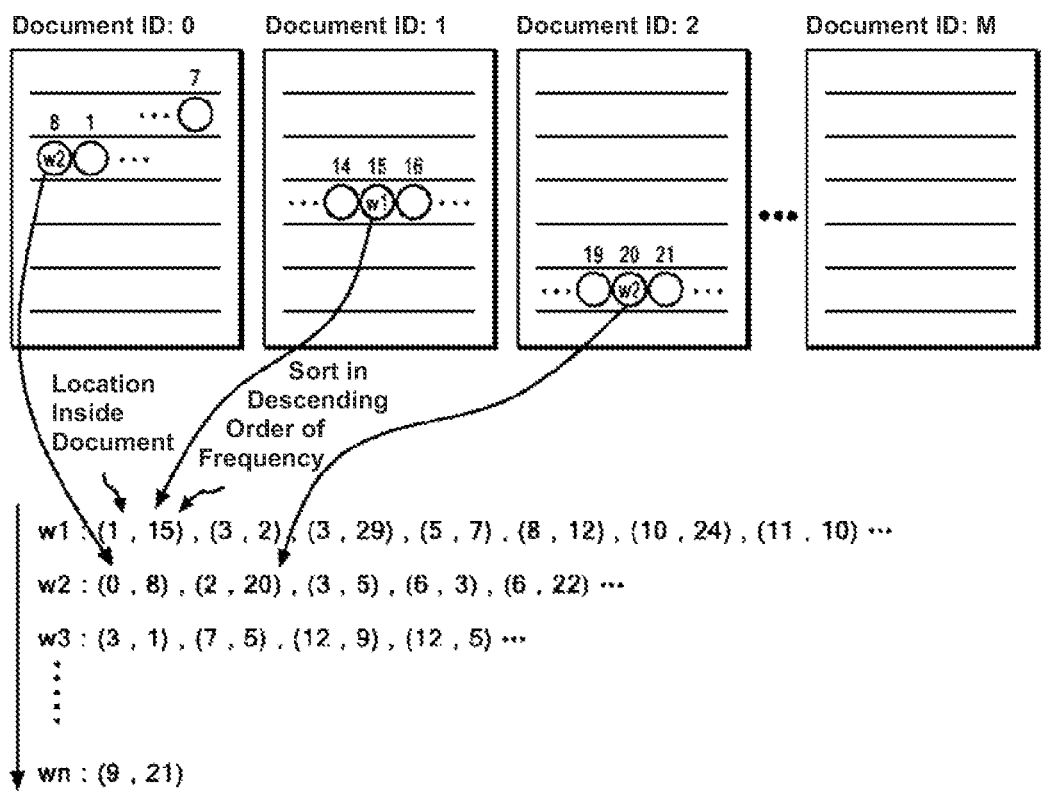
FIG. 5 is a diagram used to explain Step S11 schematically.

FIG. 4 is a flowchart used to explain in greater detail the processing performed in Step S1 of FIG. 3. First, the specifying module 101 searches for a set of a plurality of sentences (for example, 500,000 sentences) stored in the HDD 14, the occurrences of each word in the sentence set are specified hierarchically in a format including the sentence ID (upper hierarchy) and the position inside the sentence (lower hierarchy), and the list of occurrences of each word is sorted in descending order of the number of occurrences (more accurately in descending order of the number of sentence IDs) (Step S11). FIG. 5 is a diagram used to explain Step S11 schematically. The sentence specified by Sentence ID: 0-M includes a plurality of words. Among these words is the most frequently occurring word w1, whose occurrences are listed as (1, 15), (3, 2) etc., using the (sentence ID, position inside sentence) format. For example, it can be learned from this list that word w1 occurs as the 15th word in the sentence specified by Sentence ID: 1. Similarly, the next most frequently occurring word after word w1, word w2, is sorted, the next most frequently occurring word after word w2, word w3, is sorted, and so forth up to word wn.

The present invention can be applied to targets other than various types of sentences. Examples include microblogging data over networks, product information data at manufacturers, product sales data at sellers, and clinical data at medical institutions. It can also be set according to data in which units of text are set as the target. For example, when clinical data is the target, the medical record of each patient can be established as the upper hierarchy, and the occurrence of words in the examination date and time can be established as the lower hierarchy. Also, some or all of the words included in a set of a plurality of sentences can be established as the target. Here, it is preferably to establish as the target at least the most frequently occurring words in a set of a plurality of sentences. Also, the part of speech of the word can be established as the target depending on data usage patterns and user preference. For example, nouns only can be set as the target, or particles can be excluded from the target.

Next, a word compression index is created by the index creating module 102 based on a list sorted as shown in FIG. 5 (Step S12). In the following explanation, the example used is the most frequently occurring word w1. However, the process is the same for the other words (w2-wn). FIG. 6 is a diagram used to explain Step S121 and Step S122 schematically. The index creating module 101 discards the sentence positions from the occurrence list for word w1 [list w1: (1, 15), (3, 2), etc.], and creates a list including only the sentence IDs [list w1': 1, 3, 3, 5, etc.] (Step S121). Also, the index creating module 101 creates a list from list w1', which eliminates the redundant sentence IDs (here, "3, 3" is reduced to "3"), to create list 1": 1, 3, 5, etc. (Step S122). FIG. 7 is a schematic diagram used to explain 1/N compression. The index creating module 102 compresses the sentence ID bit sets to 1/N to create word compression index W1 (Step S123). In other words, list w1": 1, 3, 5, 8, 10, 11, etc. is compressed by 1/N (here, N=4). The compressed bits are true on condition that one or more uncompressed bits is true, and the elements of the corresponding sentence ID are stored on condition that two or more uncompressed bits are true. Here, sentence ID: 1 and 3, and 8 and 10 and 11 are stored. In this explanation, word compression index w1 was created using the most frequently occurring word w1 as an example. Word compression indices W2-Wn are created in similar manner for the other words (w2-wn).

Figure 8:
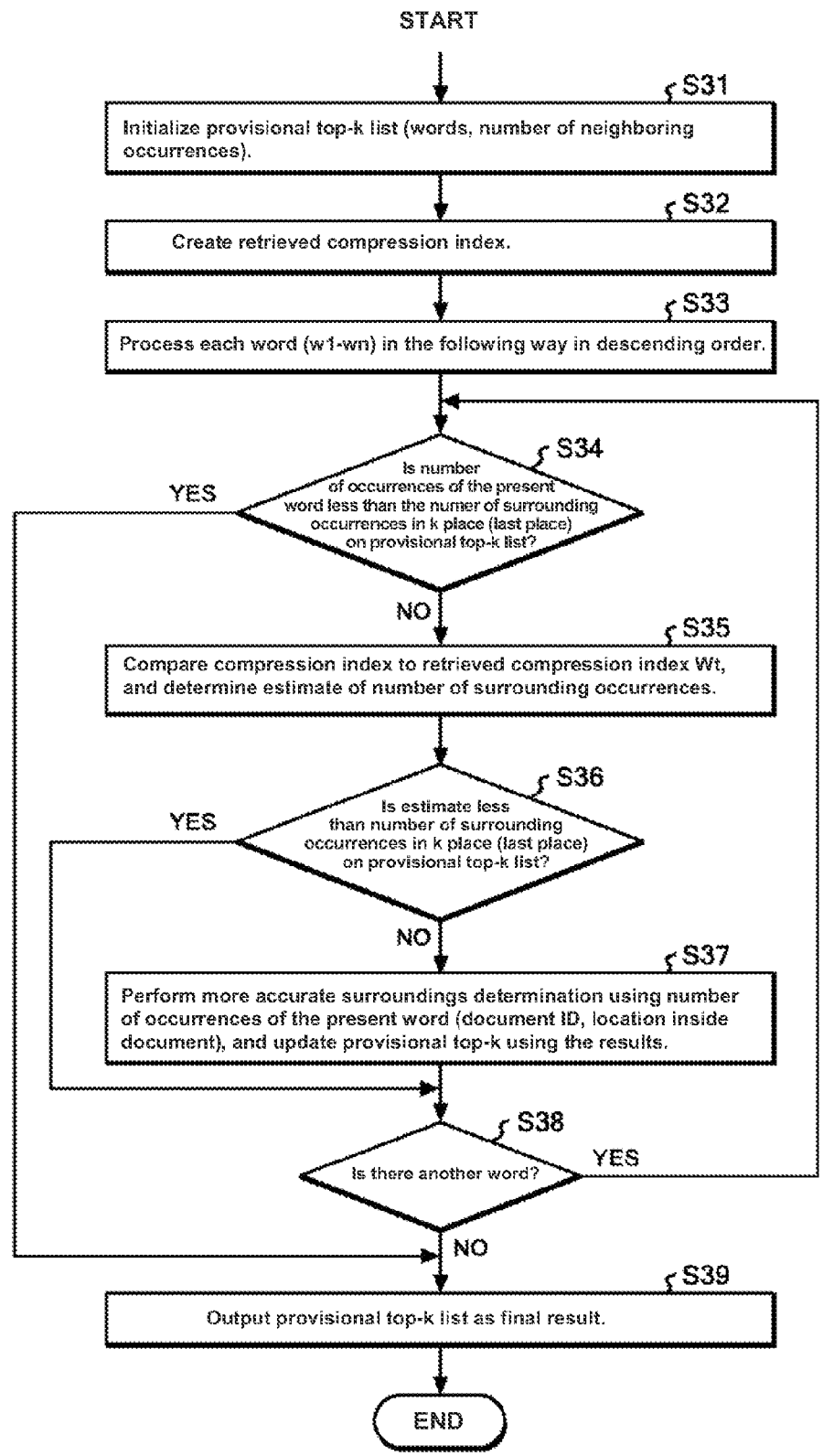
FIG. 8 is a flowchart used to explain in greater detail the processing in Step S3 of FIG. 3.
Figures 9, 10:
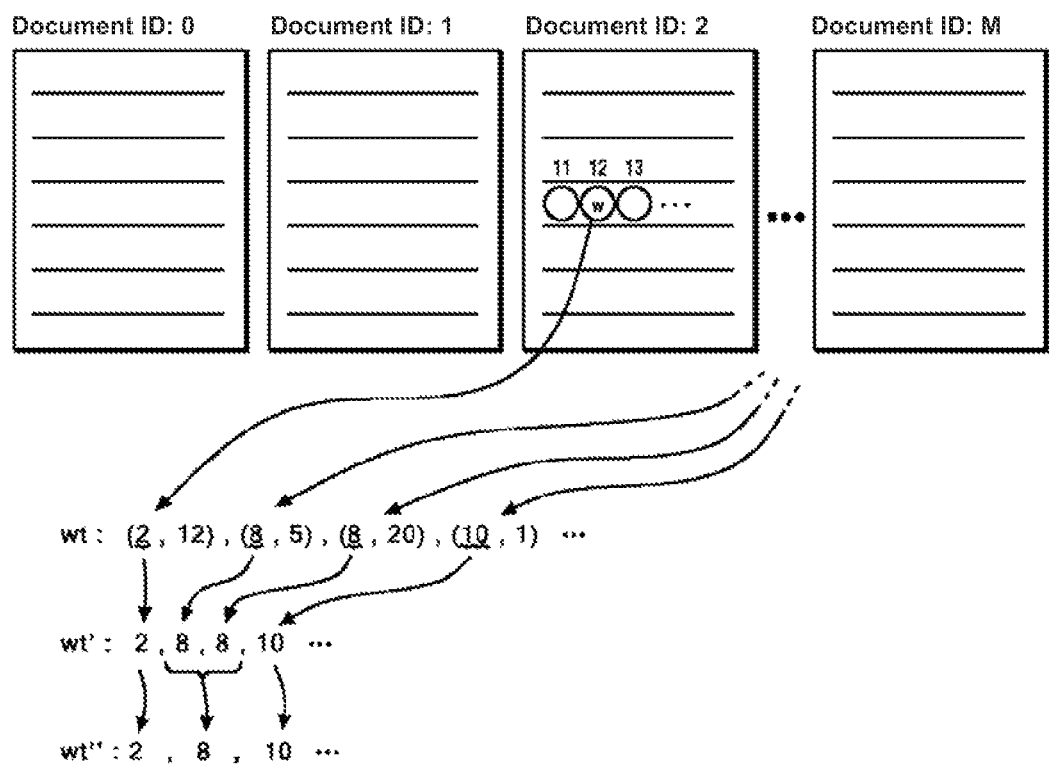
FIG. 9 is a conceptual diagram used to explain a provisional top-k list.
FIG. 10 is a conceptual diagram used to explain the creation of a search compression index.

FIG. 8 is a flowchart used to explain in greater detail the processing performed in Step S3 of FIG. 3. First, the updating module 105 initializes a provisional top-k list (Step S31). FIG. 9 is a conceptual diagram used to explain this provisional top-k list. The top k frequently occurring words in the neighborhood of search keyword wt are stored in the provisional top-k (word, number of occurrences) format. In other words, the relationship #top-k≤ . . . ≤#top-2≤#top-1 is established. Here, natural number k is predetermined or can be set by the user on an individual basis. Also, the neighborhood of the search keyword wt is established as a range X words (X: integer) before the keyword wt and Y (Y: integer) words after keyword wt. This can be established in advance or can be indicated by the user. Either one of X and Y can be set as zero or as a negative integer. The provisional top-k list can be stored by the storing module 103 in the semiconductor memory for faster access.

Next, the specifying module 101 and the index creating module 102 create a search compression index (second index) (Step S32). FIG. 10 is a conceptual diagram used to explain the creation of the search compression index. First, the specifying module 101 searches for a set of a plurality of sentences stored in the HDD 14, the occurrences of the search keyword wt in the sentence set is specified hierarchically in (sentence ID, position inside the sentence) format, and list wt of occurrences of the search keyword wt is created. Here, the occurrences of the search keyword wt are listed as (2, 12), (8, 5), etc. In other words, it is clear from the list that the search keyword wt occurs as the 12th word in the sentences specified by Sentence ID: 2. Next, the index creating module 101 discards the sentence location from the list wt: (2, 12), (8, 5), etc. of the occurrences of the search keyword wt, and creates a list of sentence IDs only wt': 2, 8, 8, 10, etc. Also, the index creating module 101 creates a list from list wt', which eliminates the redundant sentence IDs (here, "8, 8" is reduced to "8"), to create list wt" 2, 8, 10, etc. FIG. 7 is a schematic diagram used to explain 1/N compression. The index creating module 101 compresses list wt": 2, 8, 10, etc. to 1/N (here, N=4). The compressed bits are true on condition that one or more uncompressed bits is true, and the elements of the corresponding sentence ID are stored on condition that two or more uncompressed bits are true. Here, Sentence ID: 8 and 10 are stored.

The following processing is performed on each word w1-wn in descending order (w1→wn) (Step S33). First, the computing module 104 determines whether or not the number of occurrences of the word is less than the number of neighborhood occurrences of the kth (lowest) word on the provisional top-k list (see FIG. 9) (Step S34). If YES, the process proceeds to Step S39, and the output module 106 outputs the provisional top-k list as the final result. If NO, the process proceeds to Step S35, and the compression index W and search compression index Wt are compared to determine the estimated value of the neighborhood number of occurrences. This process is explained below with reference to FIG. 7. The compression index W and search compression index Wt can be stored in the semiconductor memory for faster access.

Next, it determines whether the estimated value obtained in Step S35 is less than (more specifically, equal to or less than) the number of neighborhood occurrences of the kth (lowest) word on the provisional top-k list (see FIG. 9) (Step S36). If YES, the process proceeds to Step S38, and it is determined whether or not there is another word. If YES, the process is repeated from Step S34. If NO, the output module 106 outputs the provisional top-k list as the final result. If the determination in Step S36 is NO, the process proceeds to Step S37, and the computing module 104 performs a more accurate neighborhood determination using the occurrences of the word and the occurrences of the search keyword. As a result, when the number of neighborhood occurrences of the word is greater than the number of neighborhood occurrences of the kth (lowest) word in the provisional top-k list, the updating module 105 updates the provisional top-k list.

The computing module 104 determines the estimated value for the number of neighborhood occurrences in the following manner (see FIG. 7). First, compression index W1 and search compression index Wt are compared, and the size of set intersection of both indices is calculated. Here, because two locations, the 0th bit and the 2nd bit, are true, the computing module 104 stores "2". Because this calculation is a bit calculation, the calculation is very fast. Also, the computing module 104 compares the sentence IDs: 8, 10, 11 stored in accordance with the 2nd bit of compression index W1 and the sentence IDs: 8, 10 stored in accordance with the 2nd bit of search compression index Wt, excludes the first entry "8" from both, and stores "1", which is the size of the set intersection (matching number) of sentence ID: 10, 11 and sentence ID: 10. In another example, the computing module 104 compares the sentence IDs: 8, 10, 11 stored in accordance with the 2nd bit of compression index W1 and the sentence IDs: 8, 10 stored in accordance with the 2nd bit of search compression index Wt, sets zero when there is one or less common elements, and subtracts one from the number of common elements when there are two or more common elements. In this example, "1" is stored. In both cases, the computing module 104 obtains 2+1=3 as the estimated value.

Modification

When an estimated value for a number of neighborhood occurrences was computed in the embodiment described above, a bit calculation was used to quickly obtain an estimated value. The following is an explanation of a modification in which bit calculations are used extensively. FIG. 11 is a conceptual diagram used to explain this modification. The configuration is the same as the embodiment described above, the same reference numbers are applied to components, and further explanation of these components has been omitted.

The index creating module 101 compresses list w1": 1, 3, 5, etc. by 1/N (here, N=4). The compressed bits are true on condition that two or more uncompressed bits are true, and compression index W1' (the third index) is created. Also, the number of elements on the corresponding sentence IDs is stored. Here, "2" is stored, which is the number of elements: 1, 3 in the sentence ID corresponding to the 0th bit. Also, "3" is stored, which is the number of elements: 8, 10, 11 in the sentence ID corresponding to the 2nd bit. Similarly, index creating module 101 compresses list wt": 2, 8, 10, etc. by 1/N (here, N=4). The compressed bits are true on condition that two or more uncompressed bits are true, and compression index Wt' is created. Also, the number of elements on the corresponding sentence IDs is stored. Here, "2" is stored, which is the number of elements: 8, 10 in the sentence ID corresponding to the 0th bit. Compression index W1' and/or search compression index Wt' are stored in semiconductor memory for faster access.

The computing module 104 determines the estimated value for the number of neighborhood occurrences in the following manner (see FIG. 11). First, compression index W1 and search compression index Wt are compared, and the size of set intersection of both indices is calculated. Here, because two locations, the 0th bit and the 2nd bit, are true, the computing module 104 stores "2". Because this calculation is a bit calculation, the calculation is very fast. Also, the computing module 104 compares the compression index W1' and the search compression index Wt' to calculate the set intersection of both indices. In other words, in accordance with the true bits of the set intersection, a value is calculated in which the smaller of the stored number of the sentence ID of W1' and the number of sentence ID of Wt' is added to each true bit of the set intersection. Because this calculation is a bit calculation, the calculation is very fast. Here, because one location, the 2nd bit, is true, the computing module 104 compares 3, which is the number of sentence IDs (8, 10, 11) sorted in accordance with the 2nd bit of compression index W1', to 2, which is the number of sentence IDs (8, 10) stored in accordance with the 2nd bit of the search compression index Wt', and subtracts 1 from 2, the smaller of the two numbers to obtain "1". As a result, the computing module 104 obtains 2+1=3 as the estimated value.

An embodiment (including modifications) was explained in detail above. However, it should be obvious that the technical scope of the present invention should not be construed as being limited to this embodiment.

REFERENCE SIGNS LIST

1: Personal Computer (Computer System)
11: CPU (Central Processing Unit)
12: RAM (Random-Access Memory: Storage Device)
13: ROM (Read-Only Memory: Storage Device)
14: HDD (Hard Disk Drive: Storage Device)
17: Mouse (Pointing Device)
18: Flat Panel Display (Display Device)
100: Input Module (Input Means)
101: Specifying Module (Specifying Means)
102: Index Creating Module (Creating Means)
103: Storing Module (Storing Means)
104: Computing Module (Computing Means)
105: Updating Module (Updating Means)
106: Output Module (Output Means)

What is claimed is:

1. A method of processing by computer a set of a plurality of sentences including a plurality of words, the method comprising the steps of:
    hierarchically identifying occurrences of at least some of the words in the set of sentences;
    creating a first index for each of at least some of the words based on an upper hierarchy of occurrences identified for each word;
    receiving input of a queried word;
    hierarchically identifying occurrences of the queried word in the set of sentences;
    creating a second index based on an upper hierarchy of occurrences identified for the queried word;
    comparing the first index and the second index to calculate an estimated value for the number of occurrences of a word in a neighborhood of the queried word; and
    calculating the actual value of the number of occurrences of a word in the neighborhood of the queried word based on an upper hierarchy and lower hierarchy of the occurrences on condition that the estimated value is equal to or greater than a predetermined number,
    wherein the first index and the second index have an upper hierarchy bit set compressed by 1/N where N is a natural number, and a compressed bit is true on condition that one or more uncompressed bits is true.

2. The method according to claim 1, wherein the comparison of the first index and the second index is performed by bit calculation.

3. The method according to claim 1, wherein the step of calculating an estimated value stores an element of the corresponding upper hierarchy, and calculates the estimated value of the number of occurrences of a word in the neighborhood of the queried word based on the element on condition that two or more uncompressed bits are true.

4. The method according to claim 1, wherein the step of calculating an estimated value stores the number of elements of the corresponding upper hierarchy, and calculates the estimated value of the number of occurrences of a word in the neighborhood of the queried word based on the number of elements on condition that two or more uncompressed bits are true.

5. The method according to claim 4, wherein the method further comprises the steps of:
creating a third index having an upper hierarchy bit set of the identified occurrences corresponding to each word compressed by 1/N, where N is a natural number, a compressed bit being true on condition that two or more uncompressed bits are true; and
creating a fourth index having an upper hierarchy bit set of the identified occurrences corresponding to the queried word by 1/N, a compressed bit being true on condition that two or more uncompressed bits are true;
the step of calculating the estimated value comparing the third index and the fourth index by bit calculation.

6. The method according to claim 1, wherein an estimated value for the number of occurrences of the next word among at least some of the words is calculated on condition that the estimated value does not satisfy a predetermined number.

7. The method according to claim 1, wherein the step of calculating the actual value of the number of occurrences of a word is skipped on condition that the estimated value does not satisfy a predetermined number.

8. The method according to claim 1, wherein the method further comprises a step of storing K, where K is a natural number, provisionally top frequently occurring words among the words occurring in the neighborhood of the queried word; and
the step of calculating the actual value of the number of occurrences of a word calculates the actual value of the number of occurrences of the word in the neighborhood of the queried word based on the upper hierarchy and lower hierarchy of the occurrences on condition that the estimated value is equal to or greater than the Kth provisionally top frequently occurring word.

9. The method according to claim 8, further comprising a step of updating the Kth provisionally top frequently occurring word on condition that the actual value of the number of occurrences of the word is equal to or greater than the number of occurrences of the K provisionally top frequently occurring words.

10. The method according to claim 1, wherein the estimated value of the number of occurrences of a word is a value equal to or greater than the actual value of the number of occurrences of the word.

11. The method according to claim 1, wherein an estimated value of the number of occurrences of a word is calculated in order of frequency of occurrence for at least some of the words in a set of a plurality of sentences.

12. The method according to claim 8, further comprising a step of outputting K provisionally top frequently occurring words as the final K top frequently occurring words on condition that all of at least some of the words have been completely examined.

13. The method according to claim 1, wherein at least some of the words include L, where L is a natural number, top frequently occurring words in the set of a plurality of sentences.

14. The method according to claim 1, wherein at least some of the words include words of a particular part of speech in the set of a plurality of sentences.

15. The method according to claim 1, wherein the neighborhood of a queried word is established in advance as a range X words before and Y words after an occurrence of the queried word.

16. The method according to claim 1, wherein the upper hierarchy of occurrences is a sentence ID specifying one sentence among the plurality of sentences, and the lower hierarchy of occurrences is a position ID specifying the position of the one sentence.

* * * * *